United States Patent [19]
Wilk et al.

[11] Patent Number: 4,899,131
[45] Date of Patent: Feb. 6, 1990

[54] LOCAL CONTROL SYSTEM FOR DOMESTIC APPLIANCES AND ALARM DEVICES

[75] Inventors: Sven T. Wilk, Vintrie; John I. G. Olsson, Bjärred, both of Sweden

[73] Assignee: Aktiebologet Electrolux, Stockholm, Sweden

[21] Appl. No.: 128,500

[22] PCT Filed: Apr. 19, 1987

[86] PCT No.: PCT/SE87/00173
§ 371 Date: Nov. 23, 1987
§ 102(e) Date: Nov. 23, 1987

[87] PCT Pub. No.: WO87/06380
PCT Pub. Date: Oct. 22, 1987

[30] Foreign Application Priority Data
Apr. 7, 1986 [SE] Sweden ............................. 8601545

[51] Int. Cl.⁴ ............................................. G08B 26/00
[52] U.S. Cl. ...................................... 340/518; 340/505; 340/310 R; 340/825.06; 340/531; 340/508
[58] Field of Search ............... 340/518, 531, 505–508, 340/310 R, 310 A, 310 CP, 825.06

[56] References Cited
U.S. PATENT DOCUMENTS

| | | | |
|---|---|---|---|
| 3,927,404 | 12/1975 | Cooper | 340/533 |
| 4,185,272 | 1/1980 | Feiker | 340/310 R |
| 4,392,125 | 7/1983 | Iwata | 340/505 |
| 4,468,655 | 8/1984 | Iwata | 340/505 |
| 4,535,401 | 8/1985 | Penn | 340/505 |
| 4,586,040 | 4/1986 | Akiba et al. | 340/505 |
| 4,658,243 | 4/1987 | Kimura et al. | 340/505 |

*Primary Examiner*—Donnie L. Crosland
*Attorney, Agent, or Firm*—Pearne, Gordon, McCoy & Granger

[57] ABSTRACT

A control system has a central unit for applying DC operating current and control signals to a two line bus. The central unit applies a DC operating current to the bus, as well as signals that have first and second parts. A terminal connected to the bus detects first signal parts on the bus that are unique to that terminal, and, in response thereto, applies the second signal parts to its output terminals. A manual control unit is connected to receive operating current and signals from the output terminals. The manual control unit has a plurality of keys connected to load the bus, and is responsive to determined second signal parts for inhibiting such loading of the bus, thereby enabling the central unit to determine and address of the manual control unit.

7 Claims, 3 Drawing Sheets

LOCAL CONTROL SYSTEM FOR DOMESTIC APPLIANCES AND ALARM DEVICES

BACKGROUND OF THE INVENTION

The present invention relates to a local control system for machines, apparatus, alarms, sensors and similar system loads in a home.

The primary object of the invention is to provide a local system of the kind indicated which permits one or two-way communication between a central unit and peripheral units connected to the central unit by a two-wire bus line. In one-way communication, for example, a range or a washing machine connected to the system can automatically be switched on or off. In two-way communication an alarm loop can be connected by a control signal transmitted from the central unit and the change in the current level on the bus caused by the connection of the loop gives a current response which constitutes a message from the peripheral unit to the central unit.

DESCRIPTION OF RELATED ART

A local system of the kind indicated is known from the published International Patent Application WO-81/02962. In this system the central unit comprises means for generating control signals which consists of a repetitive series of signal frames, each frame including a reset pulse and a plurality of other pulses. The central unit includes control means which causes selectable alteration of a characteristic of said other pulses. Each of said peripherial units is addressed following receipt of a respective predetermined number of said other pulses, said pheripheral units being responsive to said selectable characteristic of the other pulses whereby control instructions are transmitted to address peripheral units in accordance with operation of said control means. Data and address information are contained within the same other pulse.

According to the system described above all peripheral units are addressed in a predetermined order and reset pulse is required to reset counters and the like in the perpheral units.

SUMMARY OF THE INVENTION

A draw-back in the system described is that a selected peripheral unit cannot be addressed directly but only following the predetermined order. The system of the present invention differs from the system described above in that addressing is performed by a pulse train starting with an address part to which a data part is connected which may contain an instruction. Such an arrangement belongs to the prior art and starting from this arrangement a special object of the invention is to permit under certain circumstances a peripheral unit to receive a signal and to transmit part of it to an additional local system connected to the said peripheral unit or to a manual control unit connected to the system of which said perpheral unit is part.

BRIEF FIGURE DESCRIPTION

The invention will now be described more in detail in connection with the appended drawings.

In FIG. 1 a block diagram is shown of a local system.

DETAILED DISCLOSURE OF THE INVENTION

Figure 1:
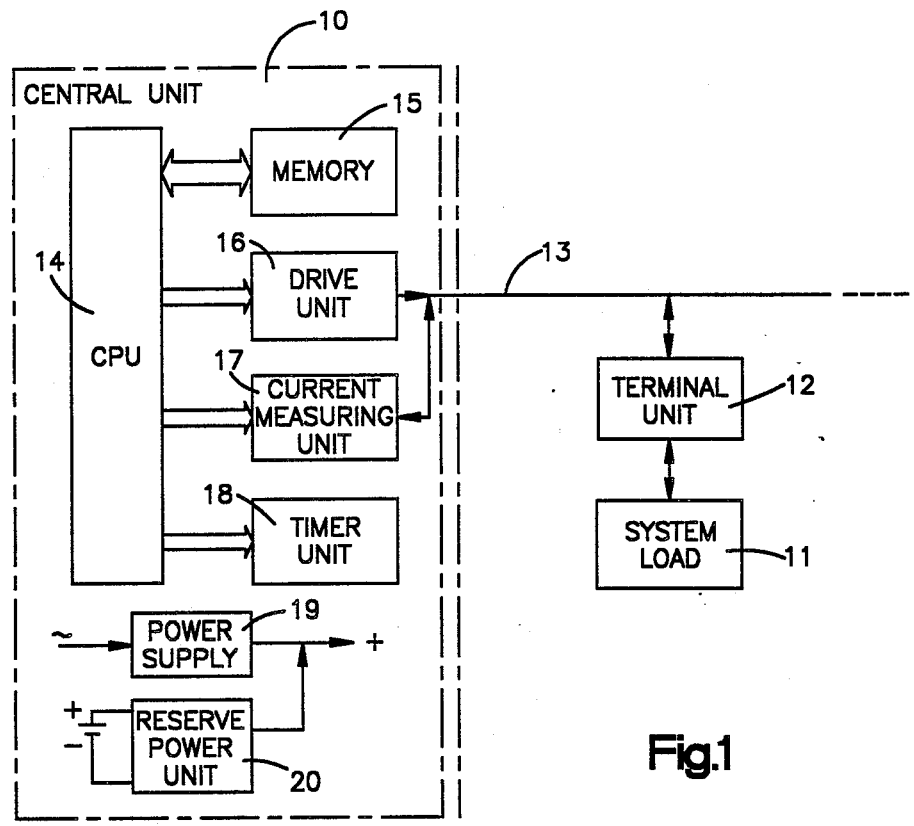

As appearing in FIG. 1 the local system consists of two main parts, the central unit 10 and a plurality of system loads 11 (only one of which is shown). The system loads are connected to the system via so-called terminal units 12, which are constituted of a standardized coupling device admitting the selective connection and disconnection of a system load. A two-wire bus line 13 interconnects the terminal units with the central unit.

The central unit includes a microprocessor or CPU 14 and a memory unit 15. The CPU is the brain of the system which controls the power supply of the bus line 13 via a drive unit 16. Via the drive unit, also, control signals are sent to the terminal units 12 for connecting or disconnecting of the respective system load. A current measurement unit 17 is connected to the bus for measuring current variations occuring on the bus line. The measurement results are transferred to the CPU. Moreover, a timer unit 18 is connected to the CPU, said timer unit generating the clock pulses needed and in addition performing real time measurements. The central unit is supplied from a power supply 19. A battery-equipment reserve power unit 20 maintains the power supply during a predetermined time in case of mains failure.

Figure 2:
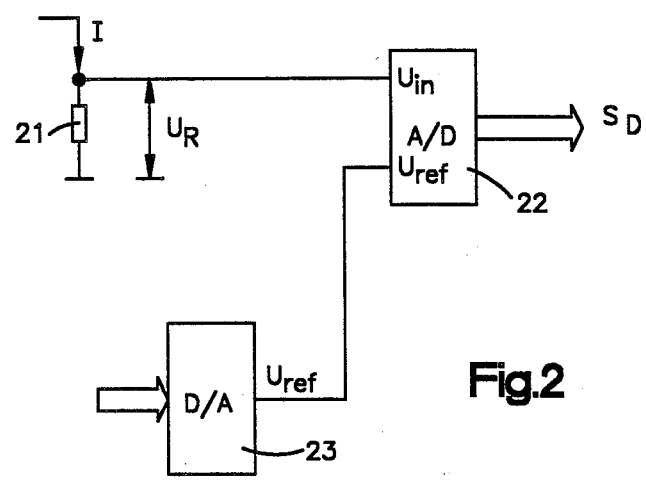
FIG. 2 shows a block diagram of a current measuring device.
Figure 3:
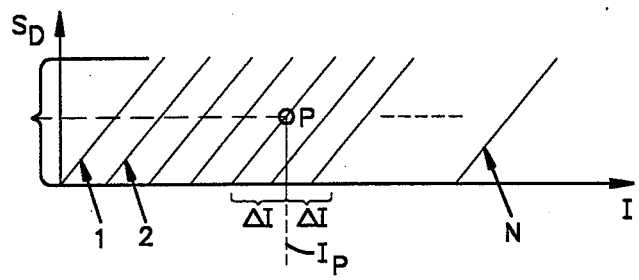
FIG. 3 is a graph relating to the block diagram of FIG. 2.

The changes in current of the two-wire bus 13 can be measured in different ways, one of which will be described with reference to FIGS. 2 and 3. In the central unit one conductor of the bus line is terminated by a series resistor 21 across which a voltage $U_R$ appears which corresponds to the line current I. This voltage is transferred to the input $U_{in}$ of an A/D converter 22 which emits at its output an output signal $S_D$ that is a digital measure of the voltage $U_R$. This signal $S_D$ is transferred to the CPU 14. In order for the measurement to be made over a large range with sufficient accuracy and with a limited word length of the digital signal $S_D$ the meaasuring range has been split up into a plurality of part ranges, in the example 16 part ranges. The CPU selects the measuring range such that the maximum change in the current I will be achieved within the same measuring range. The characteristic of the A/D converter 22 is illustrated in the graph of FIG. 3, wherein a number of linear current parts have been traced. These current parts represent the different measuring ranges and have been numbered 1–16. Hence, for the current $I_P$ the measuring range No. 5 is chosen causing the point P to be situated so that the maximum change $\Delta I$ in the current I within the measurement range can be detected. A signal corresponding to the selected measuring range is transferred to a D/A converter 23 which emits a corresponding reference voltage $U_{ref}$ to the A/D converter 22.

Figure 4:
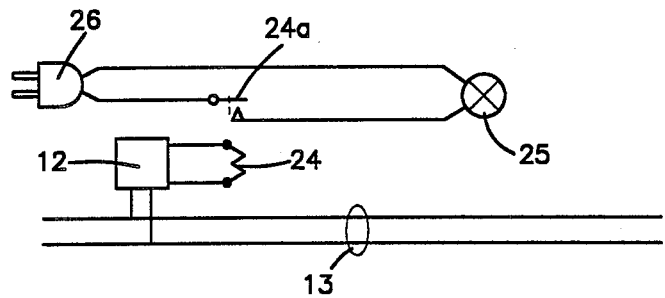
FIGS. 4 and 5 are examples of various system loads connected to the system via coupling devices called terminal units.
Figure 5:
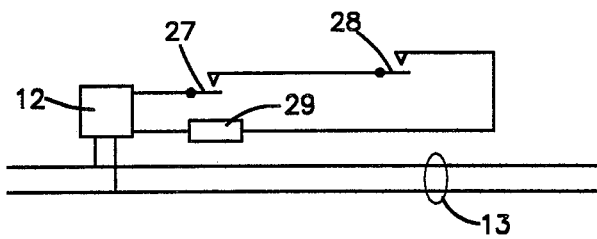

As appears in FIGS. 4 and 5 various system loads can be connected to the system. FIG. 4 illustrates the connection of a relay 24 which controls the switching on and off, respectively, of a lamp 25 connected to the mains via a relay contact 24a and a connecting plug 26.

FIG. 5 shows the connecting of an alarm loop comprising contacts 27-28 in series with a resistor 29. With the contacts closed the connecting of the loop causes a first current response whereas if any of the contacts are open the current will take a different value.

Figure 6:
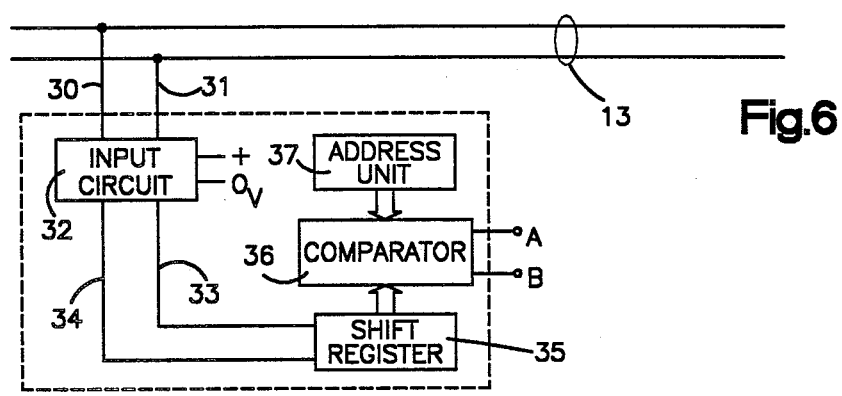
FIG. 6 is a block diagram of a terminal unit.

An important component of the system is the standardized terminal unit 12 which will now be described with reference to FIG. 6. The unit is connected to the bus line 13 via conductors 30,31 connected to an input circuit 32 of the discriminator type. The duty of the input circuit is to separate the supply voltage of the bus line from signals transmitted on the line. Moreover, the input circuit should be designed such that the separated supply voltage appears with unequivocal polarity even in case the conductors 30,31 are shifted. Therefore, the input circuit comprises a rectifier bridge. Via conductors 33,34 the signal outputs of the input circuit are connected to a shift register 35 the parallel outputs of which being connected to a comparator 36. To the comparator is also connected an address unit 37 comprising fixed addresses assigned to the outputs A and B of the terminal unit. The addresses can be in the form of address plugs insertable in corresponding sockets in the terminal unit thereby connecting predetermined inputs of the comparator to earth potential.

In connecting or disconnecting one of the outputs A or B a corresponding signal is transmitted from the central unit. The signal comprises a seven bit address code followed by a data part with an instruction to connect or disconnect said output. In the comparator the address code is compared with the fixed address relating to the selected terminal unit and equality between the address code and the fixed address form together with the data part a logical condition for the connecting or disconnecting of the selected output. Any detailed description of the design of the terminal unit in this respect will not be given.

Figure 7:
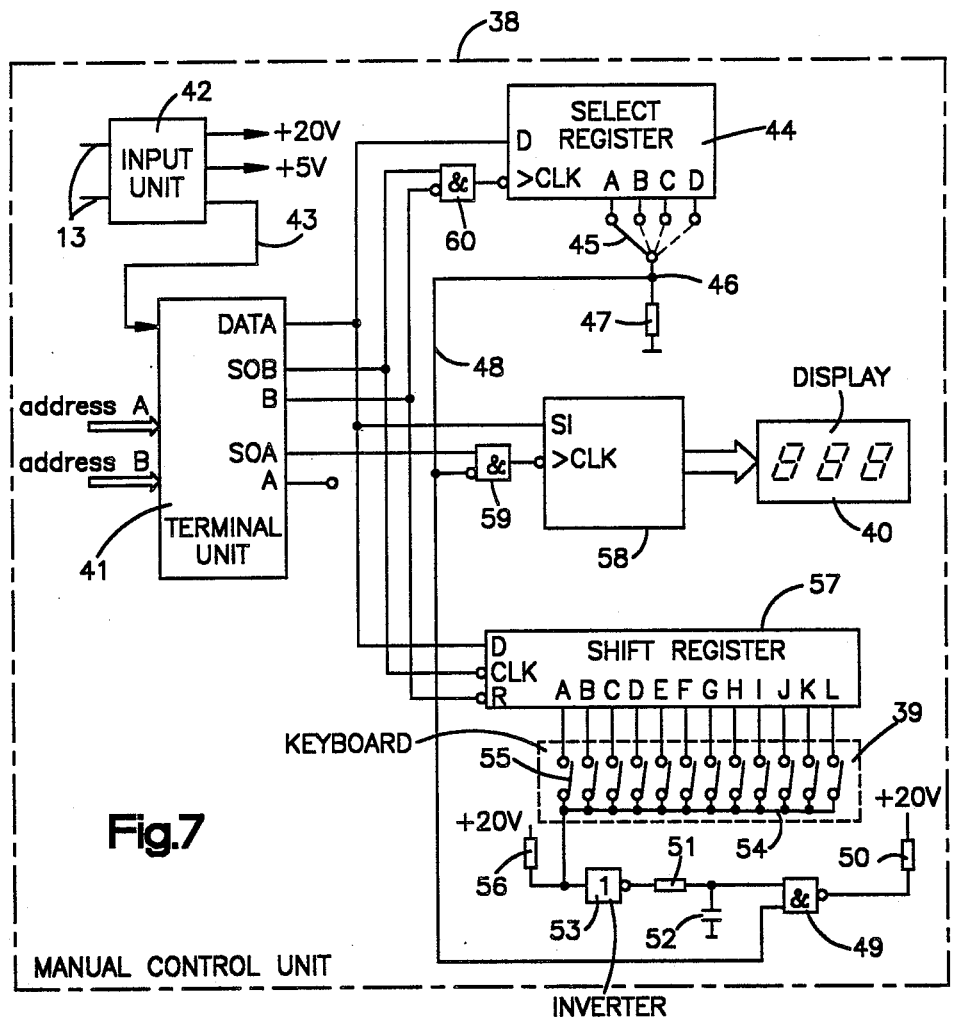
FIG. 7 is a circuit diagram for a manual control unit interconnected with a terminal unit.

In order to give instructions to the system as well as to receive information from the system about various system parameters there is provided a manual control unit. This unit, having the reference numeral 38, is shown in FIG. 7 and comprises a keyboard 39 and a line display 40. For the purpose of being connectable to the two-wire bus at any point the manual control unit is provided with a built-in terminal unit 41. This terminal unit has a design which is mainly the same as for the unit 12 of FIG. 6, however, in addition to the outputs A and B the terminal is provided with additional outputs SOA and SOB and with a data output D. The outputs A and B are used for the connection of alarm loops, machines and similar system loads whereas the outputs SOA and SOB, being serial outputs, are intended for the transfer of information to or from the manual control unit or, for example, another local system.

The manual control system of FIG. 7 has an input circuit 42 which is arranged to convert the supply voltage of the bus line to supply voltages suitable for the unit, in the example +5V and +20V. The input circuit 42 corresponds to the input circuit 32 of the terminal unit shown in FIG. 6. Data signals appearing on the bus line are transferred to the terminal unit 41 via a conductor 43. As before, the terminal unit is provided with fixed addresses for the outputs A and B, said addresses being referred to as address A and address B, respectively.

The activating of a manual control unit can be made in different ways and in the following a preferred embodiment will be described wherein for all connected manual control units, in the example 4 units, the address A and the address B are the same, whereas a separate select function has been introduced which has a unique programming for each of the manual control units. The select function comprises a select register 44 having four outputs A, B, C, D which via a selector 45, can be selectively connected to a point 46 which via a resistor 47 is connected to earth potential. In addition, the point 46 via a conductor 48 is connected to one input of an AND-gate 49, the inverting output of which is connected via a resistor 50 to the supply voltage 20V. Via a circuit consisting of a resistor 51 and a capacitor 52 the second input of the AND-gate 49 is connected to the output of an inverter 53 the input of which is connected to a conductor 54 interconnecting one side of a number of contacts 55 included in the keyboard 39 in the manual control unit. The object of the circuit including the resister 51 and the capacitor 52 is to eliminate the effect of key contact bounces. Further, the conductor 54 via a resistor 56 is connected to the supply voltage 20V. At their opposite ends the contacts 55 are connected to outputs A through L of a shift register 57. The register has a data input D connected to the output DATA of the terminal unit 41, an inverting input CLK connected to the output SOB of the unit 41, and an inverting reset input R connected o the output B of the unit 41.

The line display 40 of the manual control unit is controlled by a control circuit 58 of the type 7225. One input SI of the control circuit is connected to the data output of the terminal unit 41. An inverting clock input of the circuit 58 is connected to an AND-gate 59, one input of which is connected to the output SOA of the terminal unit whereas the second input is connected to the conductor 48. Finally, the select register has an inverting clock input connected to the output of an AND-gate 60. Of this gate one input is connected to the SOB-output of the terminal unit 41 while the second input of the gate, which is an inverting input, is connected to the output B of the unit 41.

The selection of a manual control unit takes place in the following way. As mentioned above, all manual control units have the same address while the programming of the select function is different. At rest the select register 44 is filled with ones, i.e. all manual control units connected to the system are activated. If now any of the keys 55 is operated, the input of the inverter 53 will go low which means that one input of the AND-gate 49 will go high. Since the select register 44 is filled with ones all outputs A-D have high potential causing also the second input of the AND-gate 49 to be at high potential. Then the output of the gate 49 will go low and current will flow through the resistor 50 and a change in current will appear on the two-wire bus line. This change in current is detected in the central unit which emits a signal filling the select register 44 with zeros until the change in current ceases in dependence on the selector switch 45. Then, the CPU 14 in the central unit knows in which one of the manual control units the operated key 55 is to be found. After that the select register is filled with a code only selecting the manual control unit in which the key was operated.

Figure 8:
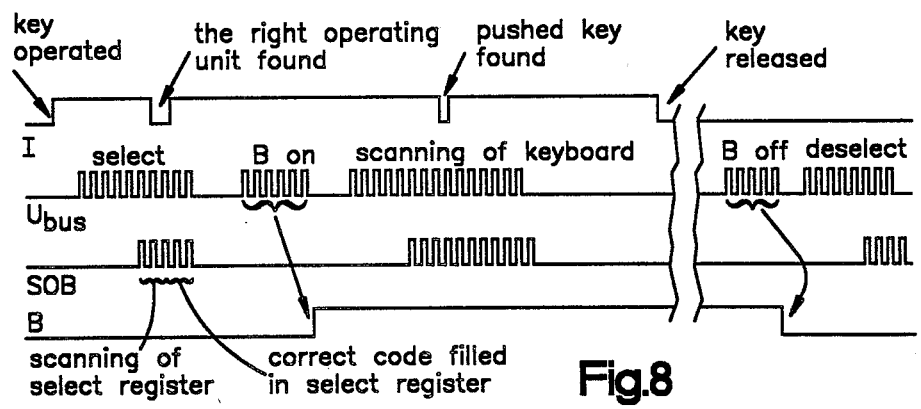
FIG. 8 is a graph relating to the circuit diagram of FIG. 7.

Keyboard scanning and activation of the line display will now be described with reference to the time graph shown in FIG. 8. In the graph there are indicated in turn the current I in the bus line, the signals on the line and status at the outputs SOB and B, respectively, of the terminal unit. Comments relating to the various signals have been inserted in the graph.

Upon a key 55 being operated in the manual control unit an increase in the current I takes place which is detected by the central unit. As described above, a select signal will then be transmitted on the line which scans the select register and which upon the right manual control unit being found fills the register with the right code. After the select signal a signal follows which activates the B-output and then a signal for scanning of the keyboard. Via the data output of the terminal unit this signal is supplied to the data input of the shift register 57 and is clocked into the register by means of a clock signal appearing at the SOB-output of the terminal unit. This will be possible as the output B is at a high level and hence the reset input of the shift register 57 is at a low level. When the operated key has been found there is a short return to the current level prevailing before the key was operated which together with the fact that the central unit knows at which pulse in the scanning signal the change in current occurred makes possible the identification of the operated key. Then a signal is transmitted on the line which inactivates the output B of the terminal unit and finally a signal "deselect" follows which again fills the select register with ones. All additional key operations will be sensed in the same way.

The display unit is charged in a similar way as the scanning of the key board is performed. Then, the clock pulses required are applied to the control unit 58 via the output SOA of the terminal unit and an additional condition is that the manual control unit is selected causing the conductor 48 to be at a high level. Then, an arbitrary number of bytes can be transmitted.

We claim:

1. In a local control system for system loads, comprising a central unit and a two-wire bus line interconnecting the central unit and the system loads, wherein the system loads are connected to the bus line via terminal units which are responsive to a voltage signal emitted by the central unit and being unique with respect to a respective terminal unit for applying a control signal to a predetermined system load, the central unit being connected to apply a DC voltage to the bus line for supplying operating power to the respective terminal unit and system loads connected to the system, the central unit comprising means for detecting changes in the bus line current and for determining the status of a system load from said changes, the improvement wherein said central unit comprises means for emitting a first signal unique to a respective terminal unit and followed by an additional signal, said respective terminal unit comprising means responsive to the first signal for transferring said additional signal to an output of the terminal unit, and further comprising a manual control unit connected to said output, said manual control unit comprising a keyboard having keys and including means responsive to depression of said keys for varying current flowing in said bus line, said central unit being responsive to variation in said current in said bus line for applying a signal including said first and additional signals to said terminal unit said additional signal operating to identify the key being pressed.

2. A system according to claim 1, wherein the manual control unit further comprises a display unit.

3. A system according to claim 1, wherein the manual control unit and the terminal unit form a signal unit which is connectable to the bus line in any position.

4. A system according to claim 1, further comprising at least one additional manual control unit, a select register having a plurality of outputs equal in number to the number of manual control units connected to receive said additional signals from said terminal unit, said terminal unit having addresses stored therein which are the same for all of said manual control units, the select registers having addresses which are unique for each manual control unit.

5. In a control system for controlling system loads, comprising a central unit, a two-wire bus line connected to the central unit, and a terminal unit connecting at least one system load to the bus line, the terminal unit being responsive to a signal emitted by the central unit that is unique to the respective terminal unit for applying a control signal to said system load, the central unit being connected to apply a DC voltage to the bus line for supplying operating power to the respective terminal unit and the system load connected thereto, the central unit comprising means for detecting changes in the bus line current and for determining the status of a system load from said changes, the improvement wherein said central unit comprises means for emitting a first signal unique to a respective terminal unit and followed by an additional signal, said respective terminal unit comprising means responsive to the first signal for transferring said additional signal to an output of the terminal unit and further comprising a manual control unit connected to said output, said manual control unit comprising a key-board having keys connected to vary current flowing in said bus line, said manual control unit comprising means responsive to the receipt of said signal from said terminal unit for inhibiting said variation of said current caused by operation of any of said keys, said additional signal operating to identify the key being pressed.

6. The control system of claim 5 wherein said inhibiting means comprises a shift register having the stages thereof connected to separate ones of said keys, and means coupling said keys to said bus line, whereby operation of said keys causes loading of said bus line in dependence upon the state of the respective shift register stage, and means for directing said additional signals to said shift register.

7. The control system of claim 5 comprising a logic circuit for coupling said keys to said bus line, and said inhibiting means comprises a register, means applying said additional signals to said register, and means applying a selected output of said register to said logic circuit, whereby a load is applied to said bus lines in response to depression of said keys and predetermined signals stored in said register.

* * * * *